(12) United States Patent
Chamness et al.

(10) Patent No.: US 7,039,271 B2
(45) Date of Patent: May 2, 2006

(54) REDUCED ELEMENT OPTICAL ADD-DROP MULTIPLEXER

(75) Inventors: Eric V. Chamness, Moutain View, CA (US); Jenkin A. Richard, Palo Alto, CA (US); Yiqiang Li, San Jose, CA (US)

(73) Assignee: Oplink Communications, Inc., Fremont, CA (US)

(*) Notice: Subject to any disclaimer, the term of this patent is extended or adjusted under 35 U.S.C. 154(b) by 337 days.

(21) Appl. No.: 10/387,239

(22) Filed: Mar. 12, 2003

(65) Prior Publication Data

US 2004/0101235 A1    May 27, 2004

Related U.S. Application Data

(63) Continuation-in-part of application No. 10/306,332, filed on Nov. 27, 2002.

(51) Int. Cl.
*G02B 6/28* (2006.01)
(52) U.S. Cl. ........................................ 385/24
(58) Field of Classification Search ............ 359/341.1; 385/24, 31, 33; 398/79, 83, 85, 88
See application file for complete search history.

(56) References Cited

U.S. PATENT DOCUMENTS

| | | | |
|---|---|---|---|
| 5,493,440 A * | 2/1996 | Souda et al. ............. | 359/341.1 |
| 5,712,717 A | 1/1998 | Hamel et al. | |
| 5,778,118 A | 7/1998 | Sridhar | |
| 5,796,889 A * | 8/1998 | Xu et al. ....................... | 385/24 |
| 5,812,291 A | 9/1998 | Bendelli et al. | |
| 5,822,095 A | 10/1998 | Taga et al. | |
| 5,926,300 A | 7/1999 | Miyakawa et al. | |
| 5,960,133 A | 9/1999 | Tomlinson | |
| 6,205,269 B1 | 3/2001 | Morton | |
| 6,535,668 B1 * | 3/2003 | Liu et al. ....................... | 385/33 |
| 6,553,160 B1 * | 4/2003 | Cao ............................. | 385/24 |
| 6,860,644 B1 * | 3/2005 | Gage et al. ................... | 385/74 |

OTHER PUBLICATIONS

OPLINK Communications, Inc., "100 GHZ Optical Add/Drop Multiplexer (1x2)", OADM 101 A/D Series, Aug. 15, 2002, pp. 23-24.
Browave Corporation, "3-Port Add/Drop Filter", Aug. 15, 2002, p. 24.
Koncent, "Three-port CWDM", Aug. 15, 2002, pp. 41-42.
Optical Coating Laboratory, Inc. (OCLI), "OCLI Filters for Coarse WDM Applications", Aug. 23, 2002.

* cited by examiner

*Primary Examiner*—Karl D. Frech
*Assistant Examiner*—Jamara A. Franklin
(74) *Attorney, Agent, or Firm*—Fish & Richardson P.C.

(57) ABSTRACT

A low cost compact integrated 4-port single-channel OADM with improved optical isolation and low insertion loss is provided in which a 4-fiber pigtail includes I/O fibers and add/drop fibers, which are arranged on the same side of the multiplexer. A lens, filter and reflector are arranged in a double-pass configuration to route the optical signals to and from the appropriate fibers. The fibers are suitably arranged with the input and drop fibers at the corners of one diagonal and the output and add fibers at the corners of the crossing diagonal with the midpoints of the diagonals intersecting. Furthermore, a point halfway between the input and output fibers suitably lies at or near the central axis of the collimating lens.

27 Claims, 8 Drawing Sheets

REDUCED ELEMENT OPTICAL ADD-DROP MULTIPLEXER

CROSS-REFERENCE TO RELATED APPLICATIONS

This application claims benefit of priority under 35 U.S.C. 120 to U.S. application Ser. No. 10/306,332 entitled "3-Port Optical Add-Drop Multiplexer (OADM)" filed on Nov. 27, 2002, the entire contents of which are incorporated by reference.

BACKGROUND OF THE INVENTION

1. Field of the Invention

This invention relates to optical add and drop multiplexers (OADMs) used in optical communication systems and more specifically to a compact and inexpensive integrated single-channel OADM with improved optical isolation.

2. Description of the Related Art

Optical communication systems are a substantial and fast-growing constituent of communication networks. Such optical systems include, but are not limited to, telecommunications systems, cable televisions systems, and local area networks (LANs). Wavelength division multiplexing (WDM) is one approach for increasing capacity.

A WDM system employs multiple optical signal channels, each channel being assigned a particular channel wavelength. In a WDM system, optical signal channels are generated at the different channel wavelengths, multiplexed to form a multiplexed optical signal, transmitted over a single fiber or waveguide and demultiplexed such that each channel wavelength is individually routed to a designated receiver.

In many such applications, there is a need to route one or more of the multiplexed channels to different destinations. Such routing occurs when optical channels are sent to or withdrawn from an optical transmission link, e.g. for sending optical channels between a terminal and an optical bus or routing long distance telecommunications traffic to individual cities. This form of optical routing is generally referred to as "add-drop multiplexing."

To enable a given channel wavelength to be branched off a transmission link using WDM or a given channel wavelength to be added to the link, an element called an optical add/drop multiplexer (OADM) has been developed. The task of the OADM is (1) to direct off a selected narrow-band channel wavelength from the multiplexed optical signal that passes in an input fiber (drop function) and/or 2) to add to an output fiber a narrow-band channel wavelength (add function). The signals (channel wavelengths) that have not been selected pass through the OADM from the input to the output fiber.

Figure 1:
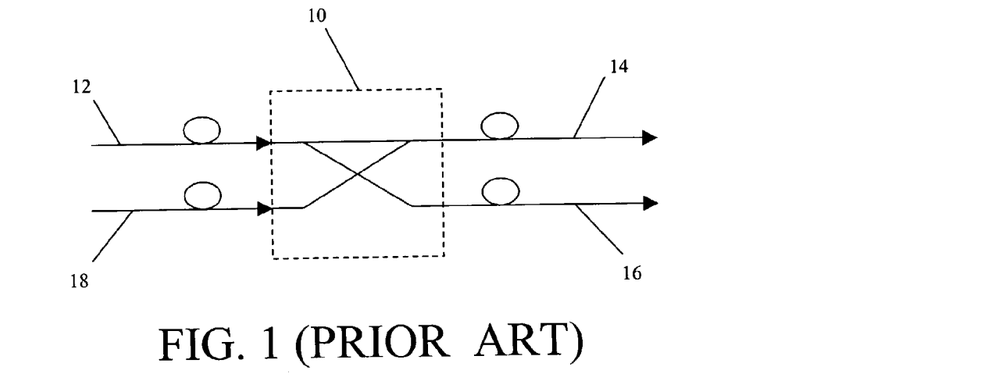
FIG. 1, as described above, is a block diagram of a generic OADM.

As shown in FIG. 1, an OADM 10 receives a multiplexed optical signal from an input fiber 12 and transmits the multiplexed optical signal to an output fiber 14. Typically, most of the signals pass through the OADM 10 with no change. In the case of a 3-port add OR drop multiplexer, the OADM 10 can either remove a signal via drop fiber 16 or replace a signal via add fiber 18. The device includes either drop fiber 16 or add fiber 18 but not both. In the case of a 4-port add AND drop multiplexer, the OADM 10 has the capability to remove one or more of the multiplexed signals from the input fiber 12 and put them on a drop fiber 16 and place replacement signals from an add fiber 18 onto the output fiber 14. Multi-channel OADMs can be made by combining single-channel add AND drop multiplexers or single-channel add OR drop multiplexers.

Figure 2:
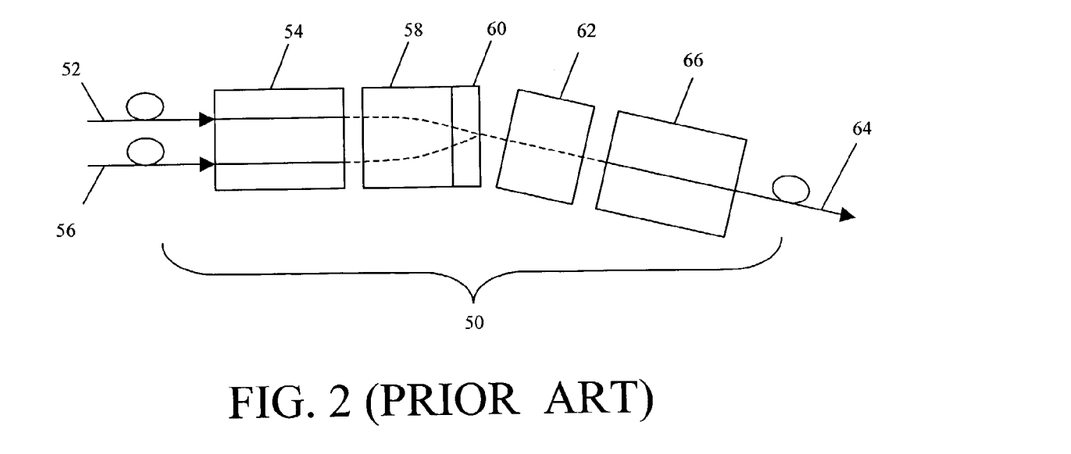
FIG. 2, as described above, is a block diagram of a known 3-port add OR drop mux.

As shown in FIG. 2, in a typical 3-port single-channel drop OADM 50 the multiplexed optical signal enters OADM 50 through an input fiber 52, which is mounted in a dual-fiber glass ferrule 54 along with output fiber 56. The optical signal exits fiber 52 at the output side of ferrule 54, is collimated by lens 58, suitably a C or GRIN lens, and free-space coupled to a thin-film filter 60. The filter is designed to transmit a particular channel wavelength and reflect the remaining channel wavelengths. The filter specifications depend on what application the OADM is being used for, such as dense or coarse WDM, tap monitoring, multi-channel splitting, etc. In a drop configuration, the transmitted and collimated optical channel wavelength enters a second lens 62, which focuses the signal into a drop fiber 64 in a single-fiber glass ferrule 66. The remaining channel wavelengths are reflected back through lens 58, which focuses the optical signal onto output fiber 56. In the add configuration, all directions of light propagation are reversed. A channel wavelength enters through add fiber (also 64), is collimated by lens 62, passes through filter 60 and enters lens 58, which focuses the signal into output fiber 52 with the multiplexed optical signal.

This implementation is used by JDS Uniphase (Fixed Add/Drop Modules), Oplink Communications (OADM 101A/D Series), Browave (3-Port Add/Drop Filter) and Koncent (Three-Port CWDM). The current 3-port optical add OR drop multiplexer uses two fiber collimators—two sets of lenses, ferrules and fibers, thus has high cost and large packaging size, approximately 5.5 mm in diameter and 32 mm in length. The input/output fibers and add/drop fiber are arranged on opposite sides of the device, which is inconvenient because of the space that is taken up by having fiber bend radii on both sides of the device.

Figure 3:
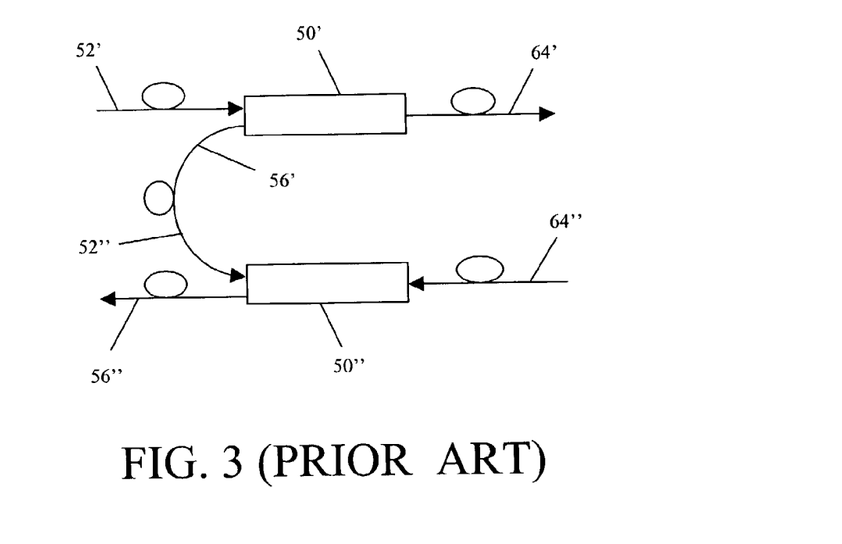
FIG. 3, as describe above, is a block diagram of a known integrated add AND drop mux.

The typical and most practical single-channel OADMs are configured by fiber splicing two 3-port single-channel OADMS together. As shown in FIG. 3, a 4-port OADM is configured by fiber splicing the output fiber 56' of the 3-port drop OADM 50' to the input fiber 52" of a 3-port add OADM 50". Add OADM 50" is identical to drop OADM 50' except that input and output fibers shown in FIG. 2 have been reversed to facilitate the add function. In operation, a multiplexed optical signal carrier on input fiber 52' enter OADM 50' and the desired channel is dropped on drop fiber 64'. The remaining optical channels are reflected back to output fiber 56', which is fiber spliced to input fiber 52". The multiplexed optical signal, absent the drop channel, enters OADM 50". An add channel at the same channel wavelength as the drop channel is inserted through add fiber 64" into the multiplexed optical signal, which is then transmitted on output fiber 56".

Although adequate, this 4-port OADM uses two identical filters and four fiber collimators—four sets of lenses, ferrules and fibers, thus has high cost and large packaging size because of the length of the devices, the splice, and the fibers exiting both ends of the units. In addition, the out-of-band signals which are reflected by the filters and pass from the input 52' to the output 56" experience high insertion loss because they must be coupled into fibers twice before exiting the system A known 4-port single-channel OADM uses two three-port optical circulators with a narrowband fiber grating (U.S. Pat. No. 5,822,095) or a thin film filter (U.S. Pat. No. 5,926,300) positioned between the two optical circulators. These devices are very expensive and bulky on account of the two three-port circulators and suffer from poor optical isolation. Another single-channel OADM arranges two identical thin-film filters in parallel planes to reflect the input beam twice to solve the optical isolation problem (U.S. Pat. No. 5,812,291). U.S. Pat. No. 5,712,717 proposes another way to improve optical isolation by combining a thin-film filter with a Bragg grating filter through fibers.

SUMMARY OF THE INVENTION

The present invention provides a low cost, compact integrated OADM with improved adjacent channel optical isolation and low insertion loss for the expressed (pass-through) signals in which the input, output, add, and drop fibers are located on the same side of the OADM.

An OADM is provided with a 4-fiber pigtail, a collimating lens, a filter and a reflector that together eliminate the need for either two 3-port Add/Drop Modules or a pair of circulators. The 4-fiber pigtail includes the input, output, add, and drop fibers, which are all on the same side of the device. A lens collimates an optical beam path coming out of each fiber such that a central axis of each optical beam path substantially intersects at or near a focal point of the lens. The filter is positioned at or near the lens focal point and the filter and collimating lens together are angled so that optical signals in the filter's reflection band are reflected back through the collimating lens from the input fiber to the output fiber. The reflector is positioned at or near the lens focal point and angled such that optical signals in the filter's transmission band are reflected back through the collimating lens from the input and add fibers to the drop and output fibers, respectively.

For this compact integrated OADM to efficiently couple the optical signals to and from the appropriate fibers, the fibers are preferably arranged with a certain symmetry with respect to each other and to the collimating lens. First, a point halfway between the input and output fibers should lie on the central axis of the collimating lens at the output side of the ferrule. This optimizes fiber-to-fiber alignment as the signal travels from the input fiber, through the lens, reflects off the filter at or near the lens focal point, travels back through the lens and is coupled into the output fiber. Second, the add and drop fibers are preferably arranged such that the added signal reflects off of the reflector and couples into the output fiber and the dropped signal reflects off the reflector and couples into the drop fiber. For optimal alignment, the reflector is preferably positioned at or near the focal point of the collimating lens and angled and at the output side of the ferrule the add and drop fibers are preferably arranged such that the input and drop fibers are at the corners of one diagonal and the output and add fibers at the corners of another diagonal with the diagonals intersecting at or near their midpoints. Although these constraints can be achieved with a number of fiber configurations, the simplest, most practical, and lowest cost is a square.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a low cost, compact integrated OADM with high optical isolation and low express port (pass through) insertion loss in which the I/O fibers and add/drop fiber are arranged on the same side of the device.

A single integrated 4-port optical add and drop multiplexer has the equivalent functionality of two standard 3-port devices joined together to form an OADM, as referenced in FIGS. 2 and 3. However, the integrated OADM uses a single fiber collimator—one set of a lens, a ferrule and fibers as compared to four fiber collimators—four sets of a lens, a ferrule, and fibers. In addition, the integrated OADM uses one filter instead of the two required when using two 3-port devices. Consequently, the integrated OADM uses nearly ¼ the materials required by a conventional OADM and is nearly ¼ the size. All of these factors contribute to this device having a lower cost and more compact packaging size, approximately 5.5 mm in diameter and 17 mm in length, than the typical OADM described in reference to FIGS. 2 and 3.

Figure 4:
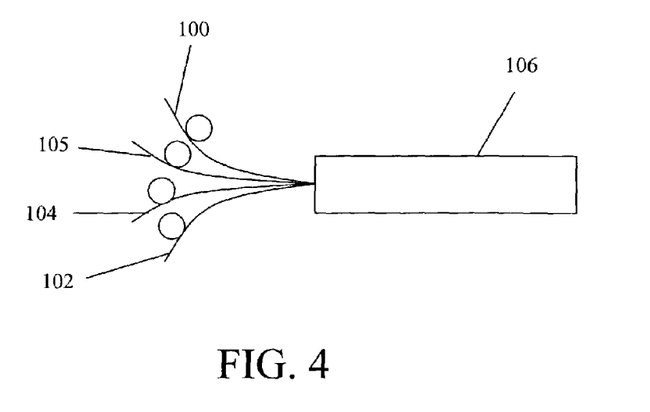
FIG. 4 is a diagram of a packaged OADM in which the I/O and add/drop fibers are configured on one side of the device in accordance with the present invention.

In addition, as shown in FIG. 4, the input/output fibers 100 and 102 and add/drop fibers 104 and 105 are arranged on the same side of the OADM package 106. This is particularly important given that the standard minimum bend radius for a fiber is approximately one inch. Having the four fibers on one side of the device eliminates the bend radius on one end and can eliminate the need for a fiber bend radius altogether, substantially reducing the overall footprint of the device. Because the process of adding and dropping a signal is performed in the same unit with a single filter there is no need to send the output signal to a second device where the out of band signals must enter a second input fiber, reflect off a second filter, and then be refocused into a second output fiber, as is the case with current OADMs. This additional path results in doubling the insertion losses for the signals passed through the OADM, and is thus very detrimental for fiber networks that have many OADM nodes. Also, the integrated OADM has the unique advantage of providing twice the isolation from other channels in the system because the added and dropped signals are required to pass through the filter twice before entering their respective output and drop fibers.

As shown in FIGS. 5–8, a four-port optical add-drop multiplexer (OADM) 110 in accordance with the present invention comprises a glass ferrule 112 having an input side 114 and an output side 116, and opening(s) 119 formed therethrough. Input, output, add and drop optical fibers 100, 102, 104 and 105, respectively, are inserted in the opening and extend outwardly from the same input side of the ferrule and OADM. Together the ferrule and four fibers form a 4-fiber pigtail 130 with all of the fibers on one side.

A collimating lens 132 such as a C-lens or GRIN lens is positioned on output side 116 of ferrule 112. The lens collimates an optical beam path coming out of each fiber such that a central axis of each optical beam path substantially intersects at or near a focal point 133 of the lens. For optical signals going back into the fibers, the lens focuses the reflected optical signals such that the beams are coupled into the appropriate fibers.

A filter 134 such as a thin-film filter with a coating 136 available from OCLI, Inc. is positioned at or near lens focal point 133 and preferably fixed together with lens 132. The assembly is angled such that optical signals in the filter's reflection band are reflected back through the collimating lens from the input fiber to the output fiber and optical signals in the filter's transmission band are transmitted through the filter as functionally shown in FIG. 6. Filter 134 suitably comprises a bandpass filter or one or more cascaded lowpass or highpass filters.

Figure 6:
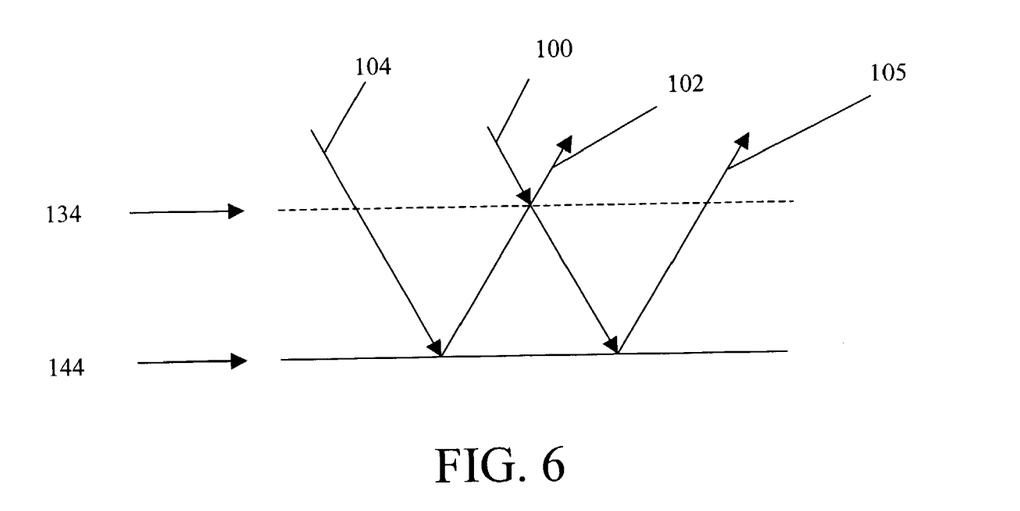
FIG. 6 is a schematic showing a two-dimensional functional diagram of the optical signals at the filter and reflector planes for a single-channel OADM.

A reflector 144 is positioned at or near the lens focal point, nearly in contact with the filter coating, and angled such that optical signals in the filter's transmission band are reflected back through the collimating lens from the input and add fibers to the drop and output fibers, respectively, as functionally shown in FIG. 6. An off the shelf dielectric mirror with a reflective coating 146 is sufficient. The reflector may be selected to reflect light across a broad band of wavelengths or across a narrow band around the signal of interest. The geometry of the device including the reflector angle and the spacing of the lens, filter and reflector is optimized to minimize coupling loss of the optical signals into the fibers. The filter's reflective coating can be formed on either its front or back surfaces. However, placement of the coating on the back surface closer to the reflector will reduce insertion loss for both the add and the drop channels by reducing the distance between the reflector and the focal point of the lens.

Figure 5A:
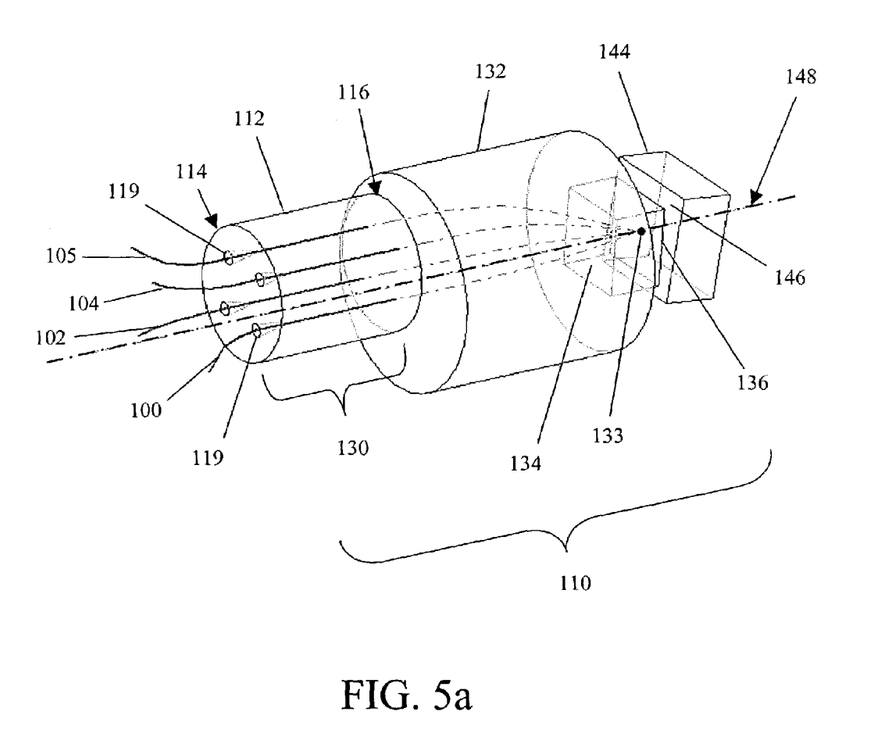
FIGS. 5a through 5d are isometric, side, top and end views of a OADM in accordance with the present invention.
Figure 5B:
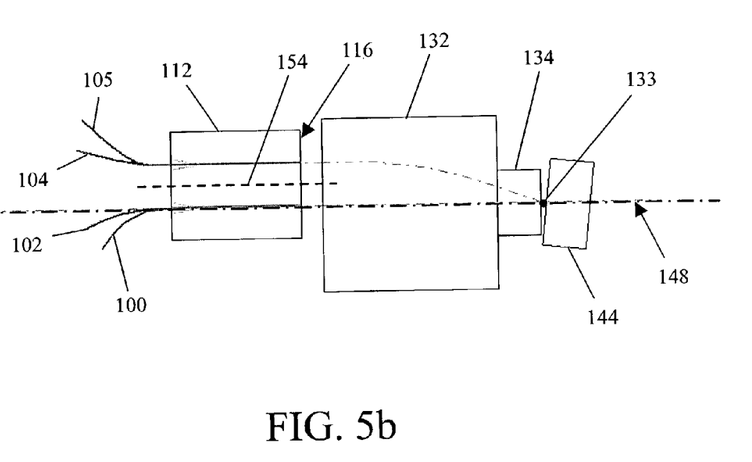
Figure 5C:
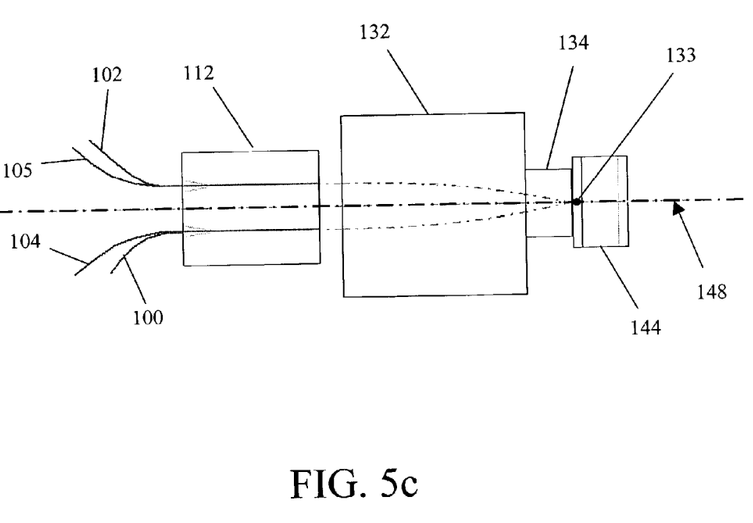
Figure 5D:
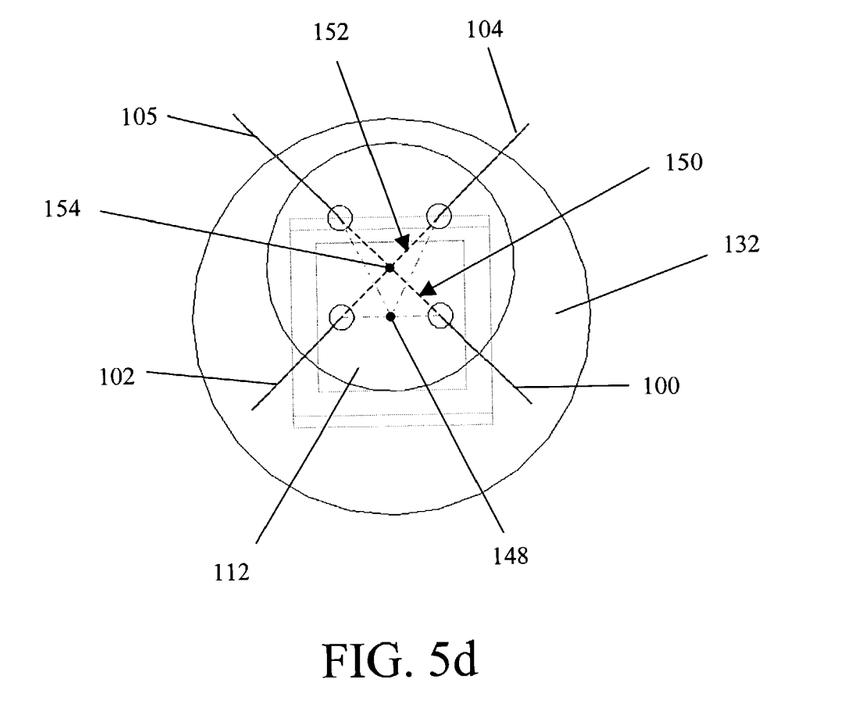

For this compact integrated OADM to efficiently couple the optical signals to and from the appropriate fibers, the fibers are preferably arranged with a certain symmetry with respect to each other and to the collimating lens, best shown in FIG. 5d. First, a point halfway between the input and output fibers preferably lies on the central axis 148 of collimating lens 132 at the output side of the ferrule. This optimizes fiber-to-fiber alignment as the signal travels from input fiber 100, through lens 132, reflects off filter 134 at the lens focal point 133, travels back through lens 132 and is coupled into output fiber 102. This symmetry is used in known 3 port devices and can been observed in FIG. 2 Second, the add and drop fibers are preferably arranged such that the added signal reflects off of the reflector and couples into the output fiber, and the dropped signal (from the input fiber) reflects off the reflector and couples into the drop fiber. For optimal alignment, reflector 144 is preferably positioned at or near focal point 133 of collimating lens 132 and angled and at output side 116 of ferrule 112 add and drop fibers 104 and 105 are preferably arranged such that the input and drop fibers 100 and 105 are at the corners of one diagonal 150 and the output and add fibers 102 and 104 at the corners of another diagonal 152 with the diagonals intersecting at or near their midpoints. Although these constraints can be achieved with a number of fiber configurations, the simplest, most practical, and lowest cost solution is a square, which is explained in more detail in FIG. 11. Note that, consistent with the design constraints, the input and the add fibers can exchange positions with the output and drop fibers, respectively, and retain the same functionality.

Figure 7A:
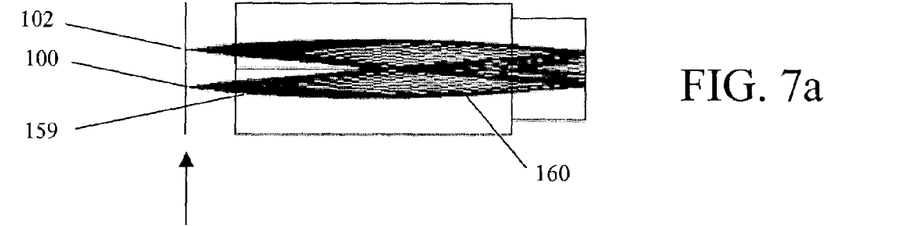
FIGS. 7a–7c and 8a–8c are top and side views of the OADM showing the optical ray traces for the 3 optical paths in the device: input-to-output, input-to-drop, and add-to-output.
Figure 7B:
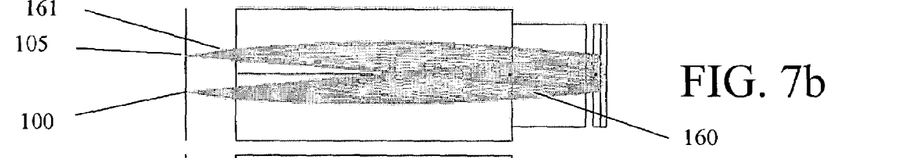
Figure 7C:
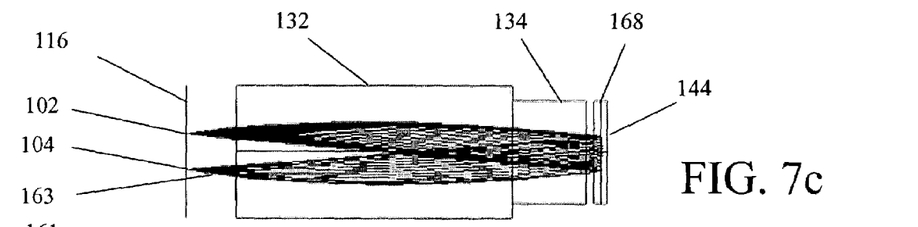
Figure 8A:
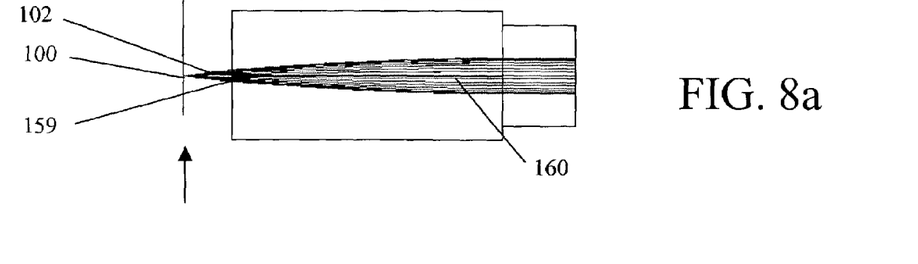
Figure 8B:
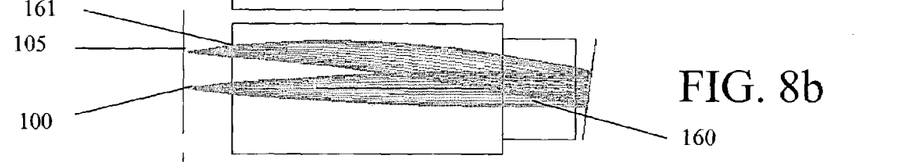
Figure 8C:
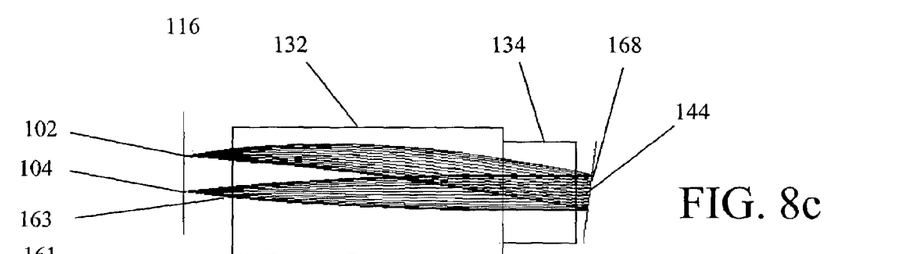

FIGS. 7a–7c and 8a–8c are top and side views of the OADM showing the optical ray traces for the three optical paths in the device: input-to-output, input-to-drop, and add-to-output. For the input-to-output path as shown in FIGS. 7a and 8a, a multiplexed optical signal 159 comprising multiple optical signals at channel wavelengths $\lambda_1$–$\lambda_N$ is carried into the device on input fiber 100 and exits the fiber at the output side 116 of the ferrule. Lens 132 collimates and directs the optical signal 160 to its focal point along the central axis of the lens. Filter 134, positioned at or near the lens focal point, passes the add/drop channel and reflects the remaining channels back to collimating lens 132, which focuses the beam so that the beam is coupled into output fiber 102. For the input-to-drop path as shown in FIGS. 7b and 8b, the dropped channel 161 passes through filter 134 and is reflected off of reflector 144 back through filter 134 to collimating lens 132, which focuses the beam so that the beam is coupled into drop fiber 105 at the output side 116 of the ferrule. At the lens focal plane 168, the optical input and drop beams 159 and 161 are collimated or nearly collimated. For the add-to output-path as shown in FIGS. 7c and 8c, the added channel 163 is brought into the device on add fiber 104, collimated through the focal point of lens 132, through filter 134 and is reflected off of reflector 144 back through filter 134 to collimating lens 132, which focuses the beam so that the beam is coupled onto output fiber 102 at the output side 116 of the ferrule and added to the other channels. At the filter/mirror plane 168, the optical input and add beams 159 and 163 are collimated or nearly collimated.

Figure 9A:
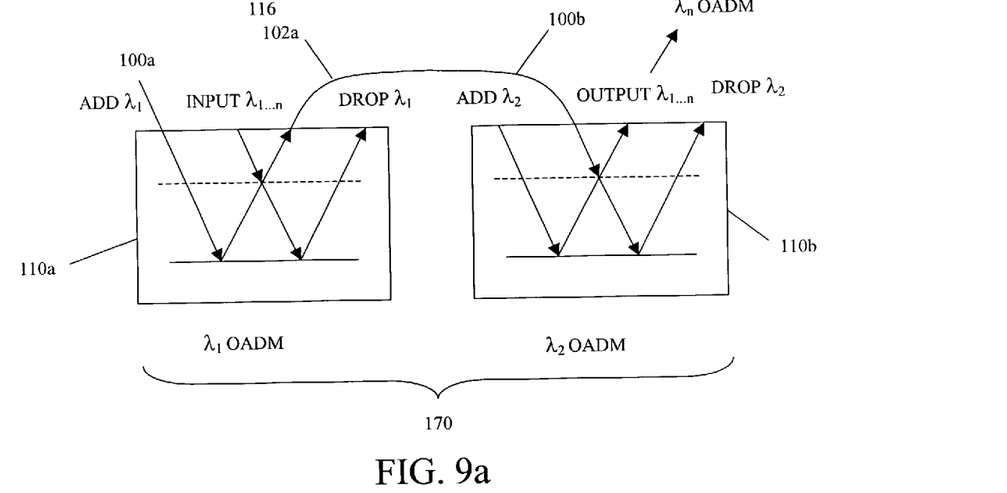
FIGS. 9a and 9b are respectively a schematic showing a two-dimensional functional diagram of the optical signals at the filter and reflector planes for a two-channel OADM and a packaged two-channel OADM.
Figure 9B:
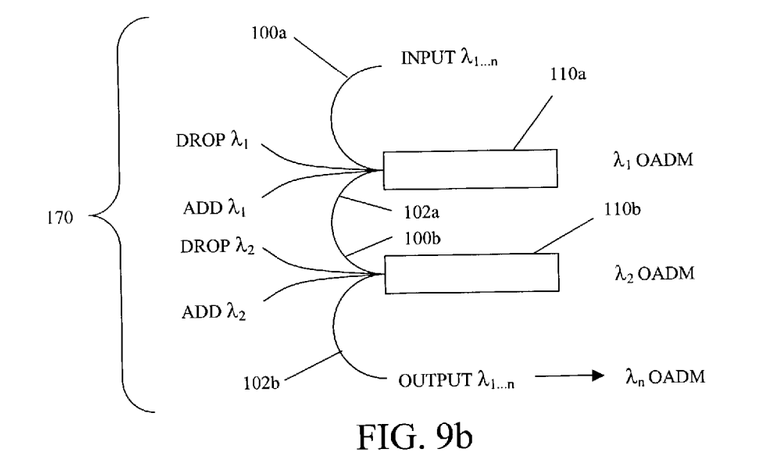

To this point, the invention has been described in the context of a single-channel OADM. However, as shown in FIGS. 9a and 9b an N-channel 4-port OADM 170 can be constructed by optically coupling the output fiber 102a of a first 4-port OADM 110a to the input fiber 100b of a second 4-port OADM 110b and so forth.

Figure 10:
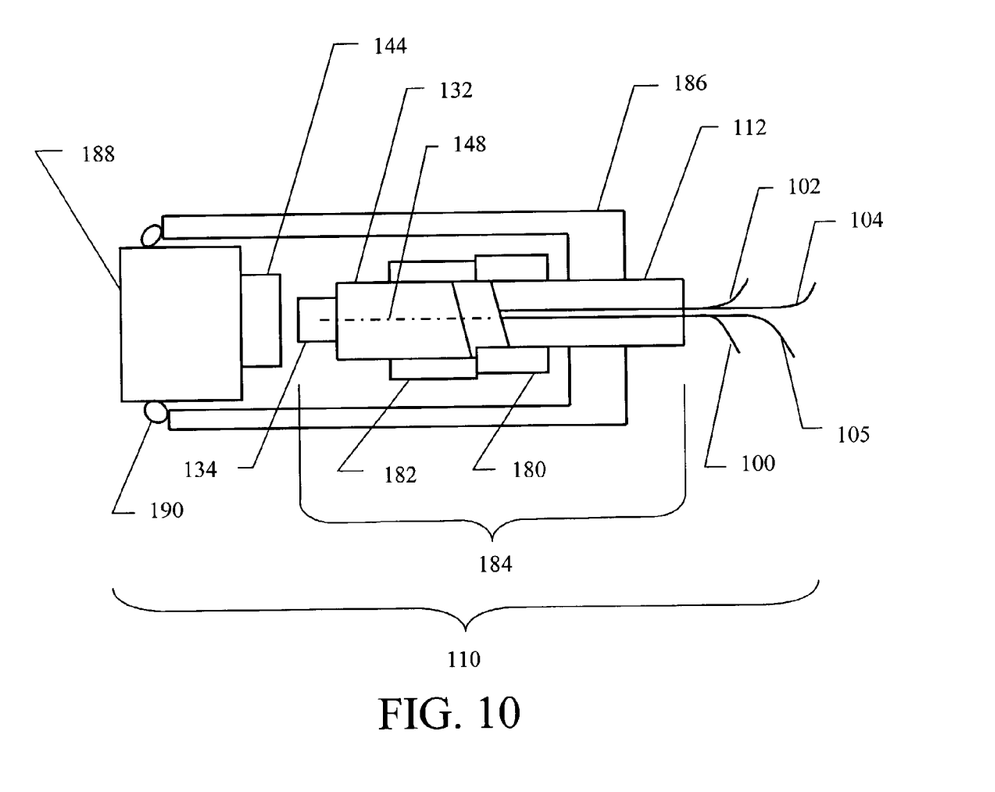
FIG. 10 is a structural diagram of an embodiment of the single-channel OADM.
Figure 11:
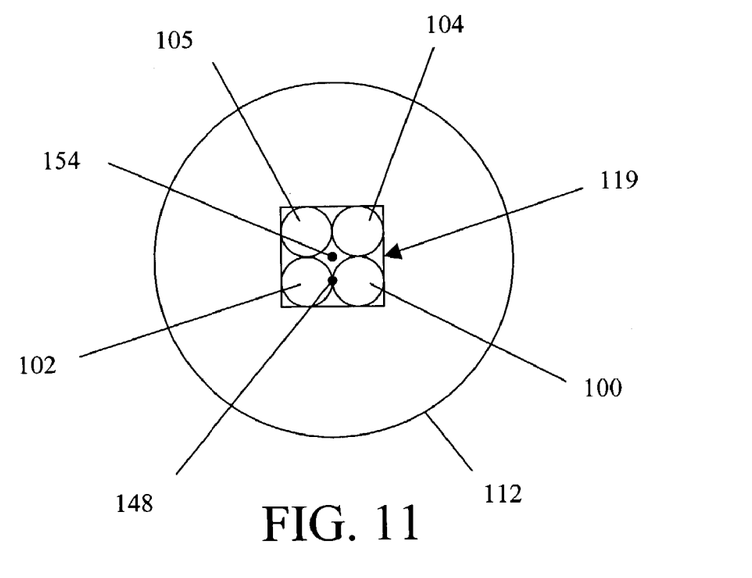
FIG. 11 is an end view of a preferred ferrule.

FIGS. 10 and 11 depict the single-channel four-port OADM 110 of FIGS. 5a–5d as it might appear in an actual package. The OADM may be assembled according to the following steps. Four fibers including fibers 100, 102, 104 and 105 are inserted into a square opening 119 in ferrule 112 such that they are in contact or nearly in contact with each other and bonded with epoxy. The ferrule assembly is inserted into a glass tube 180 and bonded with epoxy. A collimating lens 132 and filter 134 are bonded with epoxy and assembled in a second glass tube 182. This assembly is aligned and bonded to glass tubes 180 and 182 to form an aligned filter assembly 184 in which the central axis 148 of lens 132 extends through the midpoint between input fiber 100 and output fiber.

Angular and radial alignment of the beam between fibers is achieved by relative motion between glass tubes 180 and 182. Epoxy is applied to fix the correct position. Collimation of the beams can be achieved by moving the glass tubes 180 and 182 relative to each other or by sliding the lens 132 in the glass tube 182 after tubes 180 and 182 have been aligned and epoxied in the correct angular and radial positions. Conversely, the ferrule 112 may be allowed to slide in the glass tube 180 to achieve collimation. The facets of fiber pigtail and lens assemblies are preferably formed with angled faces, which reduce back reflection of the optical signals. The size of the air gap between the assemblies is dictated by the back working distance of the lens. The aligned filter assembly 184 is bonded to the housing 186 to protect the assembly and provide a mechanical reference for the reflector 144. The reflector 144 is bonded to a reflector mount 188. This assembly is then aligned to the housing 186 to minimize insertion losses and bonded in place with epoxy 190. In both alignment steps, the signal may be optimized for the correct center wavelength as well as for low insertion loss.

Figure 12:
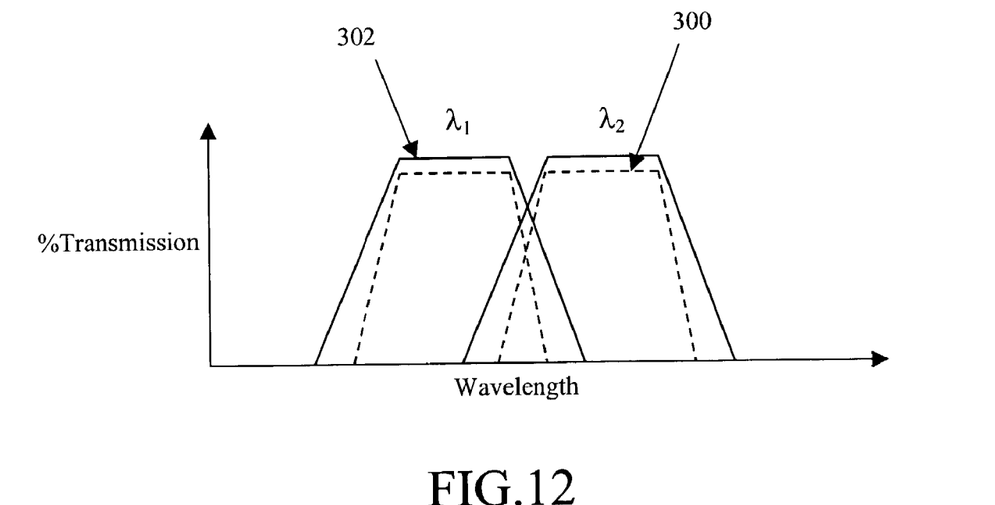
FIG. 12 is a plot of transmission versus wavelength illustrating the effects of the OADM's double-pass filter design.

As shown in FIG. 12, in an OADM a critical performance parameter is adjacent channel isolation. Comparing the double filter function 300 of the proposed OADM to the filter function 302 of a standard single-pass OADM reveals two characteristics. The proposed OADM has a slightly higher insertion loss when adding or dropping a signal but twice the adjacent channel isolation (steeper slopes) when standard filters are used. This improved isolation allows the proposed OADM to incorporate custom filters, which have extra-wide bandpass regions and corresponding lower adjacent channel isolation, because the required isolation is achieved on the second pass.

An important benefit of this OADM is its low insertion loss in passing, or expressing, signals which are not being dropped. In a standard OADM, two 3-port devices are connected as shown in FIG. 3. For out of band signals that pass through the system, they must exit the input fiber, be collimated, reflect off the filter, and be refocused back into an output fiber twice. Because this process only occurs once in the proposed configuration, the insertion loss for expressed signals is roughly half that of standard OADMs. This property is very important, because many networks, especially metro and enterprise systems, have many OADM nodes. When dropping and adding a single wavelength reduces the signal strength of all other wavelengths in the fiber, the total transmission distance is severely affected. Thus, the low loss achieved in the proposed OADM is of significant benefit.

While several illustrative embodiments of the invention have been shown and described, numerous variations and alternate embodiments will occur to those skilled in the art. For example, incorporation of a tunable filter could provide tunable integrated OADMS. Such variations and alternate embodiments are contemplated, and can be made without departing from the spirit and scope of the invention as defined in the appended claims.

We claim:

1. An optical add and drop multiplexer (OADM), comprising:
    a ferrule having an input side and an output side, and an opening formed therethrough;
    an input fiber, an output fiber, an add fiber and a drop fiber positioned within the opening of the ferrule;
    a collimating lens positioned on the output side of the ferrule, the collimating lens operable to receive optical signals from the input and add fibers and operable to transmit optical signals to the output and drop fibers;
    a filter having a first side and a second side, the first side of the filter optically coupled to the collimating lens and operable to reflect optical signals from the input fiber having one or more particular wavelengths in the filter's reflection band back through the collimating lens to the output fiber and to transmit a drop signal from the input fiber and an add signal from the add fiber having one or more particular wavelengths in the filter's transmission band through the filter to a reflector; and
    the reflector optically coupled to the second side of the filter and at an angle to the filter such that optical signals transmitted through the filter from the input and add fibers are reflected back through the filter and collimating lens to the drop and output fibers, respectively.

2. The OADM of claim 1, wherein said fibers are arranged within said ferrule such that at the output side of said ferrule endpoints of the input and drop fibers lie along a first diagonal and endpoints of the output and add fibers lie along a second diagonal, where the first and second diagonals are substantially orthogonal.

3. The OADM of claim 2, wherein the collimating lens has a central axis, said fibers being arranged such that a paint halfway between the endpoints of input and output fibers lies on or near the central axis of the collimating lens.

4. The OADM of claim 2, wherein the ferrule has a central axis that extends through the center of the opening, said fibers being arranged such that the intersection of the diagonals lies substantially along the ventral axis of the ferrule.

5. The OADM of claim 2, wherein the opening in the ferrule and the arrangement of the fibers is substantially square.

6. The OADM of claim 2, wherein the fibers are substantially in contact with each other so that the fiber-to-fiber spacings are set by the fiber diameters.

7. The OADM of claim 1, wherein the input, output, add and drop fibers extend outwardly from the input side of the OADM.

8. The OADM of claim 1, wherein the collimating lens is a C-lens or a GRIN lens.

9. The OADM of claim 1, wherein the filter comprises a thin-film filter.

10. The OADM of claim 1, wherein the filter comprises a coating on a the second surface of the filter and wherein the second surface of the filter is positioned adjacent to the reflector.

11. The OADM of claim 1, wherein said ferrule and said fibers are inside a first glass tube comprising a 4-fiber pigtail assembly, said collimating lens and said filter are in a second glass tube comprising a lens assembly, said 4-fiber pigtail assembly and said lens assembly aligned and bonded to a housing, said reflector being bonded to a reflector mount, which is aligned and bonded to said housing.

12. The OADM of claim 11, wherein the fibers are arranged with the input and drop fibers and the output and add fibers on substantially orthogonal diagonals that intersect substantially at the central axis of the collimating lens.

13. An optical add and drop multiplexer (OADM), comprising:
    a 4-fiber pigtail having an input fiber configured to receive a multiplexed optical signal comprising a plurality of optical channels, an add fiber, a drop fiber and an output fiber;
    a lens that collimates an optical beam path coining out of each fiber such that a central axis of each optical beam path substantially intersects at or near a focal point of the lens, wherein the fibers are arranged with endpoints of the input and drop fibers lying along a first diagonal and endpoints of the output and add fibers lying along a second diagonal, where the first and the second diagonals are substantially, and wherein a point halfway between the endpoints of the input and output fibers lies on or near the central axis of the collimating lens;

a filter having a first side and a second side, the first side of the filter optically coupled to the lens' focal point and operable to reflect an optical channel received from the input fiber having one or more particular wavelengths within the reflection band of the filter back through the collimating lens to the output fiber and operable to transmit a drop signal received from the input fiber and an add signal received from the add fiber having one or more particular wavelengths within the transmission band of the filter to a reflector; and the reflector optically coupled to the second side of the filter such that die add and the drop signals are reflected back through the filter and the collimating lens to the output and drop fibers, respectively.

14. The OADM of claim 13, wherein the fibers are arranged in a substantially square configuration.

15. The OADM of claim 13, wherein the fibers are substantially in contact with each other so that the fiber-to-fiber spacings are set by the fiber diameters.

16. The OADM of claim 13, wherein the input, output, add and drop fibers extend outwardly from one side of the 4-fiber pigtail.

17. The OADM of claim 16, wherein the filter comprises a coating on the second surface of the filter.

18. The OADM of claim 13, wherein said 4-fiber pigtail includes a ferrule with said fibers inside a first glass tube, said collimating lens and said filter in a second glass tube to form a lens assembly, said 4-fiber pigtail assembly and said lens assembly being aligned and bonded together to form an aligned filter assembly, which is bonded to a housing, said reflector being bonded to a reflector mount, which is aligned and bonded to said housing.

19. An optical add and drop multiplexer (OADM), comprising:

a 4-fiber pigtail having an input fiber, an add fiber, a drop fiber and an output fiber all extending outwardly from an input side of the pigtail and arranged such that at an output side of the pigtail, endpoints of the input and drop fibers lying along a first diagonal and endpoints of the output and add fibers lying along a second diagonal, where the first and the second diagonals are substantially orthogonal;

a collimating lens having a central axis that lies at or near a point halfway between the endpoints of the input and output fibers;

a bandpass filter positioned at substantially the focal point of the lens operable to transmit one or more wavelengths in a transmission band of the filter and reflect one or more wavelengths in a reflection band of the filter such that one or more particular wavelengths from the input fiber are reflected byte filter to the output port and one or more wavelengths from the input fiber and from the add fiber are transmitted through the fiber to a reflector; and the reflector optically coupled to the bandpass filter at substantially the lens' focal point where the reflector is operable to reflect wavelengths received from the add and input fibers to the output and drop fibers, respectively.

20. The OADM of claim 19, wherein the collimating lens is a C-lens or a GRIN lens.

21. The OADM of claim 19, wherein the filter comprises a thin-film filter.

22. The OADM of claim 21, wherein the fitter comprises a coating on a surface of the collimating lens facing the reflector.

23. The OADM of claim 19, wherein said 4-fiber pigtail includes a ferrule that is formed with said fibers inside a first glass tube, said collimating lens and said filter being formed in a second glass tube to form a lens assembly, said aligned and bonded together to ferrule an aligned filter assembly, which is bonded to a housing, said reflector being bonded to a reflector mount, which is aligned and bonded to said housing.

24. An optical add and drop multiplexer (OADM), comprising:

housing;

aligned filter assembly bonded to the housing, said filter assembly comprising, a 4-fiber pigtail including input and add fibers and output and drop fibers arranged inside a ferrule on respective diagonals such that endpoints of the input and add fibers lie along a first diagonal and endpoints of the output and drop fibers lie along a second diagonal where the diagonals are substantially orthogonal to each other and the fibers being assembled inside a first glass tube so that all four fibers extend from the same side of the ferrule; and a lens assembly including a collimating lens and filter coupled together and assembled inside a second glass tube, wherein said first and second glass tubes are aligned and coupled together so tat a point halfway between the endpoints of the input and output fibers lies substantially on a central axis of the collimating lens, the filter operable to transmit one or more wavelengths in a transmission band of the filter and reflect one or mare wavelengths in a reflection band of the filter such that one or more particular wavelengths from the input fiber are reflected by the filter to the output port and one or more wavelengths from the input fiber and from the add fiber are transmitted through the fiber to a reflector assembly; and a reflector assembly aligned and coupled to the housing at substantially the focal point of the collimating lens, said reflector assembly comprising a mount and a reflector coupled to the mount and where the reflector is operable to reflect wavelengths received from the add and input fibers to the output and drop fibers, respectively.

25. The OADM of claim 24, wherein the collimating lens is a C-lens or a GRIN lens.

26. The OADM of claim 24, wherein the filter comprises a thin-film filter.

27. The OADM of claim 26, wherein the filter comprises a coating on a back surface of the collimating lens facing the reflector.

* * * * *